Patented Sept. 2, 1952

2,609,365

UNITED STATES PATENT OFFICE 2,609,365

CHLORINATED POLYCHLOROPRENE LATEX

George W. Scott, Claymont, Del., assignor to E. I. du Pont de Nemours and Company, Wilmington, Del., a corporation of Delaware No Drawing. Application October 22, 1949, Serial No. 123,107

4 Claims. (Cl. 260—92.3)

This invention relates to chlorinated polychloroprene in latex form, and to a process for preparing the same.

Chlorinated elastomers, such as chlorinated polychloroprene and chlorinated natural rubber, are used commercially in alkali resistant paints. They speed the drying of alkyds and and other synthetic resins, thus aiding in faster output on production lines. When used in protective coatings they contribute specific resistance to the actions of chemicals, gases, moisture, mold growths and other destructive agents. They are also used in other ways such as in inks, adhesives and paper coatings for special uses.

The term "elastomer" as used in this specification is used in the sense described by Harry L. Fisher in Industrial & Engineering Chemistry, vol. 31, No. 8, pp. 941–945, August 1939.

The chlorination of elastomers has heretofore been accomplished by the treatment of solutions of the elastomer with chlorine or other chlorinating agents in chlorination resistant solvents such as carbon tetrachloride. This solvent process suffers from several disadvantages. Elastomers occur originally in latex form and must be isolated, dried and placed in solution prior to chlorination. Upon completion of the chlorination it is necessary to isolate the chlorinated elastomer from the solution. This requires special solvent recovery techniques in order to avoid excessive loss of solvent and to produce the chlorinated elastomer as the desired granular porous solid, such as by injecting the solution as a fine stream into hot water whereupon the solvent is flashed off and recovered and the chlorinated elastomer is separated as a porous powder. Such procedures are both cumbersome and expensive.

While it is recognized that direct chlorination of the elastomer in the latex would avoid many of the disadvantages listed above, attempts to chlorinate polychloroprene elastomers in latex have resulted in coagulation of the latex, with the elastomer separating in a mass too dense to allow ready access to chlorine and thus making it impossible to chlorinate the elastomeric material to the desired degree. This coagulation is not to be explained by the fact that hydrochloric acid is formed in the chlorination, since it takes place even when the latex contains the common acid-stable dispersing agents such as the sodium salts of sulfated methyl oleate; sulfated lauryl alcohol; the dinaphthyl methane sulfonic acids (made from naphthalene, sulfuric acid and formaldehyde); the polyethylene ethers of long chain fatty alcohols; dodecyl trimethyl ammonium bromide, or hexadecyl pyridinium chloride.

It is therefore an object of this invention to provide an efficient and economical process for the chlorination of polychloroprene in latex form. It is a further object of the invention to produce stable latices of chlorinated polychloroprene which are suitable for use in the formation of films, as coating compositions and adhesives, and for the preparation of chlorinated polychloroprene in massive form by a simple and economical procedure.

I have found that polychloroprene latices which have been prepared by the polymerization of chloroprene in aqueous emulsions, in which the emulsifying agent employed is a straight chain alkyl trimethylammonium chloride containing from 12 to 18 carbon atoms in the alkyl group, can be chlorinated directly without coagulation to give latices of chlorinated polychloroprene in which the solids remain dispersed and do not separate on storage. In practicing this invention, the use of tetradecyl trimethylammonium chloride or the long chain alkyl trimethylammonium chloride derived from the long chain fatty acids present in coconut oil (predominantly a mixture of $C_{12}$ and $C_{14}$) is preferred. The chlorinated polychloroprenes made according to this invention are readily isolated as porous white solids by coagulation or evaporation of the latex, when the chlorine content of the polymer is more than about 55%. When the chlorination is carried out to a point where the polymer contains not more than 46% of chlorine (total chlorine in polymer), the chlorinated polychloroprene may be deposited from the latex in clear, transparent films so that such latices find use in the manufacture of thin film articles, adhesives and as coating compositions. By this process a simpler and more economical method is provided for the preparation of chlorinated polychloroprene in solid form, and for the first time stable latices of chlorinated polychloroprene have been produced directly from the polychloroprene latex. This invention also makes available a simple and economical process for chlorinating chloroprene polymers which are not readily soluble in the usual chlorination solvents.

Polychloroprene latices that have been prepared by the polymerization of chloroprene in aqueous emulsions using other cationic emulsifying agents, or from other acid-stable dispersing agents such as mentioned above, are not stable to chlorination.

The polychloroprene latices which are stable to chlorination are preferably prepared by carrying out the polymerization of the chloroprene in aqueous emulsions using from 4 to 6 parts of the alkyl trimethylammonium chloride, based on 100 parts of the chloroprene monomer employed. However, stable latices may also be prepared with as little as 1% of the quaternary ammonium chloride (one part per 100 parts of monomer). It is preferred that the original aqueous emulsions of the chloroprene contain from 40% to 52% by weight of the chloroprene monomer, and usually the polymerization is run until all of the monomer is polymerized. Satisfactory latices for chlorination, however, may be prepared by short-stopping the polymerization at intermediate conversions of 50% or higher and then removing the unpolymerized monomer prior to chlorination by the usual methods.

The polymerization of the chloroprene in aqueous emulsion may be carried out in the manner ordinarily employed in the preparation of polychloroprene latices except for the use of the particular dispersing agents specified above. Polymerization modifiers such as sulfur, dodecyl mercaptan, etc., may be employed where desired. Ordinarily, the polymerization is carried out at temperatures of about 40° C., although satisfactory latices can be prepared at temperatures of from 10° C. to 55° C. While as stated above, latices containing from 40% to 52% by weight of polychloroprene are preferably employed, latices which have been diluted, for example, to a solids content of 15%, are stable to chlorination in the presence of the alkyl trimethyl-ammonium chlorides according to this invention.

The chlorination of the polychloroprene latex may be carried out by either bubbling the chlorine through the latex or by agitating the latex in an atmosphere containing chlorine. The chlorination temperature may be from 5° C. to 90° C., although in the preferred process chlorination is carried out at temperatures of from 20° to 60° C.

Chlorination catalysts, that is, ferric chloride, alpha - alpha' - azobis-(alpha-gamma-dimethyl-valeronitrile), light from a mercury arc lamp or diffuse sunlight may be used if desired. The chlorination may be accomplished in latices with a pH greater than 7 by using a buffer such as sodium acetate, or with a pH less than 7, such as in the normal cationic latex.

Polychloroprene isolated from latex prior to chlorination contains approximately 38% chlorine. The chlorine content of this polymer may be increased to as much as 63.5% by carrying out the chlorination of the polymer in latex according to this invention.

The solubility of the isolated chlorinated polymer in solvents, such as toluene or methyl ethyl ketone, may be increased by selecting polychloroprene latices for chlorination which contain elastomers made with a high content of toluene soluble polymer. These are usually produced by carrying out the polymerization in the presence of modifying agents such as dodecyl mercaptan.

The following example is given to illustrate the invention. The parts used are by weight.

*Example*

This example gives a method of preparing latices which will be stable to chlorination and describes typical chlorination procedure.

Four hundred and fifty (450) parts of chloroprene are emulsified in a solution made from 431 parts of water and 68.2 parts of a solution containing 33% tetradecyl trimethyl ammonium chloride, 17% sodium chloride and 50% water. The emulsion is warmed to 40° C. and stirred at this temperature until polymerization of the chloroprene is complete. During the polymerization, 4% of the original chloroprene separates as a polymeric coagulum. After removal of the coagulum, a latex is obtained which contains 49.3% total solids (that is, 49.3% non-volatile material when heated for 2 hours at 70° C. and 80 minutes at 140° C.).

Approximately 440 parts of the above 49.3% solids latex is stirred slowly in a pyrex flask exposed to diffuse light and equiped with a gas inlet tube which dips below the surface of the latex. Through this inlet tube chlorine gas is bubbled directly into the latex at room temperature at a rate of about 1 part per minute. At first, substantially all the chlorine is absorbed by the latex and the temperature of the latex rises to 50°–55° C. where it is maintained by external cooling. After several hours the chlorine is only partially absorbed and it is necessary to apply external heating in order to maintain the reaction at 50°–55° C. After bubbling in chlorine for a total of about 4 hours, the introduction of chlorine is discontinued. The latex remains fluid and completely stable throughout and subsequent to the chlorination. Evaporation of an aliquot part of the latex at room temperature gives a white friable powder which contains 59.7% chlorine (evaporation of polychloroprene latex similar to the original 49.3% solids latex gives a polymer with approximately 38% chlorine). Coagulation of an aliquot part of the latex by pouring it into ethyl alcohol gives a white flocculent solid which after numerous water washings contains 59.8% chlorine.

By procedures similar to those described in this example, latices stable to chlorination may also be prepared using the long chain alkyl trimethyl ammonium chloride derived from the fatty acids in coconut oil.

Latices prepared in the manner described above but using dodecyl trimethyl ammonium chloride, hexadecyl trimethyl ammonium chloride or octadecyl trimethyl ammonium chloride behaves similarly in the chlorination except that these latices become somewhat more viscous and, during the later stages of the chlorination, require further dilution or more powerful agitation for efficient utilization of the chlorine.

The chlorinated polychloroprenes isolated by air drying the latex may be prepared in a number of physical forms by varying the extent of chlorination of the latex; slight chlorination gives, after air drying, rubbery films with 38% to 42% chlorine. Further chlorination reduces the rubberiness and makes the films more plastic so that polymers with 44%–46% chlorine are clear, tough plastics. Extension of the chlorination still further gives films which become progressively less coherent and more friable as the chlorine content increases, so that polymers with 55% to 63.5% chlorine as isolated by drying the latex are all white friable powders.

These white powdery chlorinated polychloroprenes form smooth coherent sheets when worked on a hot mill. When cooled to room temperature these sheets are brittle. The addition of plasticizers, such as dioctyl phthalate, to the chlorinated polychloroprene on the hot mill gives a smooth sheet which remains flexible even at room temperature.

The chlorinated polychloroprene latex has adhesive properties where the chlorination is carried only to a point where it deposits satisfactory films. The precipitated chlorinated polychloroprene may also be used as adhesives when dissolved in suitable solvents.

Toluene solution of the white powdery chlorinated polychloroprenes upon evaporation of the toluene deposit clear films of greater or lesser plasticity, depending on the degree of chlorination.

It is of course understood that polychloroprene latices which have been prepared by the polymerization of chloroprene in aqueous emulsions, in which the alkyl trimethyl ammonium chloride is used as the dispersing agent according to the present invention, may also contain other emulsifying or dispersing agents which are compatible with the alkyl trimethyl ammonium chloride, although ordinarily they serve no useful purpose since the latices resulting from the use of the alkyl trimethyl ammonium chloride have been found to be stable. Any of the anti-oxidants or agents for stopping the polymerization short of completion, such as those disclosed in U. S. Patent 1,950,438, or other agents ordinarily used in the emulsion polymerization of chloroprene, may also be used in the preparation of the stable emulsions which may be chlorinated according to the process of this invention.

To produce the latices of the present invention which are stable during the chlorination reaction, it is essential that the polymerization be carried out in aqueous emulsions containing the alkyl trimethyl ammonium chloride.

I claim:

1. A process of chlorinating polychloroprene in aqueous emulsions which comprises adding chlorine at temperatures of from 5° to 90° C. to a polychloroprene latex resulting from the polymerization of chloroprene in an aqueous emulsion containing from 1% to 6%, based on the weight of the chloroprene monomer, of a straight chain alkyl trimethyl ammonium chloride in which the alkyl group contains from 12 to 18 carbon atoms until the desired degree of chlorination is effected.

2. A process of chlorinating polychloroprene in aqueous emulsions which comprises adding chlorine at temperatures of from 5° to 90° C. to a polychloroprene latex resulting from the polymerization of chloroprene in an aqueous emulsion containing from 1% to 6%, based on the weight of the chloroprene monomer, of an alkyl trimethyl ammonium chloride derived from the long chain fatty acids present in coconut oil, until the desired degree of chlorination is effected.

3. A stable aqueous dispersion of chlorinated polychloroprene obtained by the process of claim 1.

4. A stable aqueous dispersion of chlorinated polychloroprene obtained by the process of claim 2.

GEORGE W. SCOTT.

REFERENCES CITED

The following references are of record in the file of this patent:

UNITED STATES PATENTS

| Number | Name | Date |
| --- | --- | --- |
| 2,005,320 | Konrad et al. | June 18, 1935 |
| 2,234,203 | Starkweather et al. | Mar. 11, 1941 |
| 2,470,952 | Remy | May 24, 1949 |